United States Patent
Guntersdorfer et al.

(10) Patent No.: US 7,088,245 B2
(45) Date of Patent: Aug. 8, 2006

(54) REMOTE-READABLE IDENTIFICATION TAG AND METHOD FOR OPERATING THE SAME

(75) Inventors: Max Guntersdorfer, Grafing (DE); Helmut Zarschizky, Munich (DE); Gerhard Zorn, Aying (DE)

(73) Assignee: Siemens Aktiengesellschaft, Munich (DE)

( * ) Notice: Subject to any disclaimer, the term of this patent is extended or adjusted under 35 U.S.C. 154(b) by 61 days.

(21) Appl. No.: 10/307,366

(22) Filed: Dec. 2, 2002

(65) Prior Publication Data

US 2003/0117330 A1 Jun. 26, 2003

Related U.S. Application Data

(63) Continuation of application No. PCT/DE00/03882, filed on Nov. 6, 2000.

(30) Foreign Application Priority Data

Nov. 5, 1999 (DE) .................................. 199 53 334

(51) Int. Cl.
G08B 13/14 (2006.01)
(52) U.S. Cl. ............................... 340/572.5; 340/572.2; 340/10.2; 340/10.4; 343/702; 343/742; 343/850; 343/867
(58) Field of Classification Search ............ 340/572.5, 340/572.2, 572.1, 10.2, 572.7, 10.4; 343/702, 343/742, 850, 867
See application file for complete search history.

(56) References Cited

U.S. PATENT DOCUMENTS

| | | | |
|---|---|---|---|
| 4,069,472 A * | 1/1978 | Kamata et al. ............... 342/44 |
| 4,209,783 A | 6/1980 | Ohyama et al. |
| 4,263,595 A | 4/1981 | Vogel |
| 4,458,235 A | 7/1984 | Ohyama |
| 4,823,228 A * | 4/1989 | Bittner ....................... 361/218 |
| 5,099,227 A * | 3/1992 | Geiszler et al. .......... 340/572.5 |
| 5,444,223 A | 8/1995 | Blama |
| 5,446,447 A * | 8/1995 | Carney et al. ........... 340/572.4 |
| 5,506,478 A * | 4/1996 | Daetz ..................... 315/209 T |
| 5,891,240 A | 4/1999 | Greene |
| 5,908,444 A * | 6/1999 | Azure ......................... 607/88 |
| 5,973,598 A * | 10/1999 | Beigel ..................... 340/572.1 |
| 6,172,608 B1 * | 1/2001 | Cole ....................... 340/572.1 |
| 2002/0024216 A1 * | 2/2002 | Rose et al. .................... 285/1 |

FOREIGN PATENT DOCUMENTS

| | | |
|---|---|---|
| DE | 38 07 936 A1 | 9/1989 |
| DE | 40 09 579 A1 | 9/1991 |
| DE | 42 13 065 A1 | 10/1993 |
| DE | 197 17 505 A1 | 11/1998 |
| EP | 0 709 803 A2 | 5/1996 |
| WO | WO 98/26390 A1 | 6/1998 |

* cited by examiner

OTHER PUBLICATIONS

Klaus Finkenzeller "Vorwort" RFID-Handbook, pp. 28-29, Hanser Verlag Wien, 1998, Munich, Germany.

Primary Examiner—Tai T. Nguyen
(74) Attorney, Agent, or Firm—Sughrue Mion, PLLC

(57) ABSTRACT

A remote-readable identification tag (T) that is provided with at least two resonance circuits (81 ... 8n) and at least one transmitter/receiver antenna system (1) coupled with the circuits. The at least two circuits have a respectively different resonant frequency. A delay device (6) of the remote-readable identification tag delays a signal response between a signal received by the antenna system and a signal emitted in response by the antenna system, e.g., by delaying feeding the received signal into the resonance circuits.

24 Claims, 1 Drawing Sheet

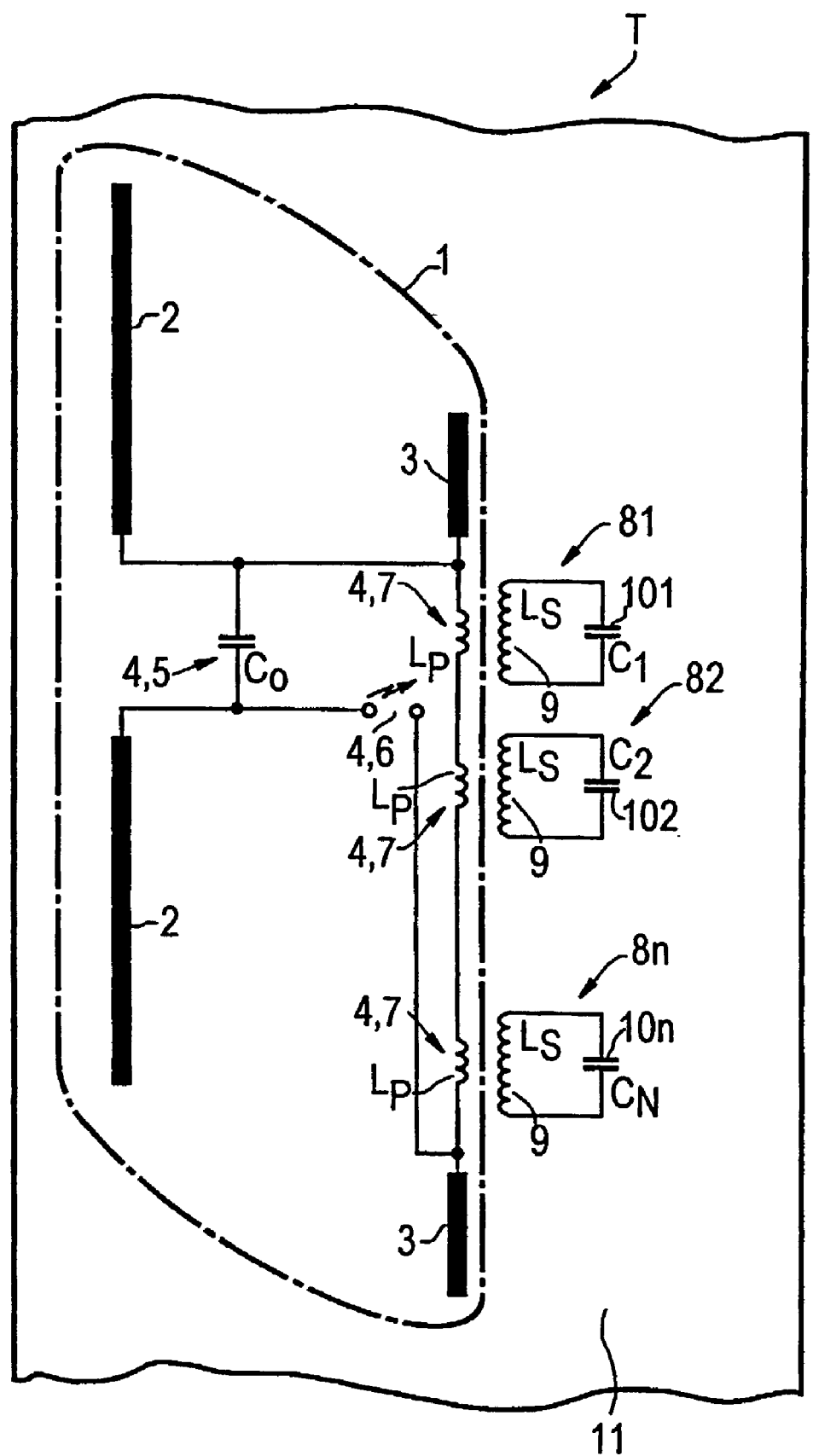

REMOTE-READABLE IDENTIFICATION TAG AND METHOD FOR OPERATING THE SAME

This is a Continuation of International Application PCT/DE00/03882, with an international filing date of Nov. 6, 2000, which was published under PCT Article 21(2) in German, and the disclosure of which is incorporated into this application by reference.

FIELD OF AND BACKGROUND OF THE INVENTION

The present invention relates to a remote-readable identification tags and methods of remote-readable identification e.g. using radio waves.

A remote-readable identification tag (Systems "MOBY"), which has a digitally stored identification number of up to 40 bits in length, is known, for example, from Siemens-Welt 6/98 or from advertising publications of Siemens AG. The digital identification number is implemented using multiple resonance circuits, excitable by radio waves ("radio frequency identification tags" or "RFID tags"), which are present on the identification tags. The radio waves (typically in the range from kHz to GHz, particularly from MHz to GHz) are at 125 kHz for system "MOBY-F", for example, and are at 433 MHz for "MOBY-V". Each resonance circuit corresponds to the representation of one bit ("1 bit RFID tag"). Multiple resonance circuits are integrated into an identification tag in accordance with the length of the identification number.

Until now, the data has been read out in that a pulse is transmitted to the identification tag, at 125 kHz for MOBY-F, for example, and the individual 1 bit RFID tags then emit pulses at essentially the same wavelength sequentially, i.e., with a time delay one after another. The identification number results in the reading device through reception of the sequential radio signals. The sequential emission of the signals of the individual 1 bit RFID tags is implemented by, inter alia, differently dimensioned delay devices.

OBJECTS OF THE INVENTION

One object of the present invention is to provide the ability for rapid remote scanning.

SUMMARY OF THE INVENTION

This and other objects are achieved, according to one formulation, by a remote-readable identification tag that includes at least two resonance circuits, which have mutually differing resonance frequencies, and at least one transmitter-receiver antenna system coupled to the resonance circuits. A signal received by the antenna system is fed into the resonance circuits, and a resonance signal of at least one of the resonance circuits is emitted via the antenna system, wherein identification coding is provided by a multi-bit sequence having a pattern corresponding to the mutually differing resonance frequencies. The remote-readable identification tag further includes a delay device that delays a signal response between receiving the signal by the antenna system and feeding the signal into the resonance circuits.

According to another formulation, the invention is further directed to a method of operating multiple identification tags that includes: receiving a signal with respective transmitter-receiver antenna systems of the multiple identification tags; coupling the received signal into respective resonance circuits of the multiple identification tags; generating response signals in the respective resonance circuits; and outputting the generated signals from the respective transmitter-receiver antenna systems after passage of respective delay times relative to a time the signal was received, wherein the delay times are of respectively different duration for the multiple identification tags.

The remote-readable identification tag according to the invention has at least two resonance circuits and at least one transmitter/receiver antenna system coupled to the resonance circuits. Furthermore, at least two resonance circuits are constituted so that they have different natural frequencies from one another.

A property inherent to the resonance circuit is to have at least one natural frequency. Through the coupling to the transmitter/receiver antenna system, signals received by the antenna system may be fed into the resonance circuits, which are thus themselves excited to resonate. The strength of the resonance in the resonance circuits becomes greater the closer the frequency of the signal received is to the natural frequency of the resonance circuit. This means that a resonance circuit of the identification tag is excited to significant resonance only if the frequency of the signal received by the antenna system lies within a range around the natural frequency of the respective resonance circuit. The width of the range is determined essentially by the half-power width of the resonance circuit. Depending on its quality, the resonance circuit continues to resonate for a relatively long time.

If the resonance circuit resonates significantly, i.e., it is at least approximately in resonance, its signal is returned to the transmitter/receiver antenna system and is emitted again. In this way, the presence of a resonance circuit in an excited field may be detected.

The resonance circuit may be utilized as a 1 bit information carrier, for example, having state "1" for presence and state "0" for absence.

The bit pattern of an identification tag is determined by the number of resonance circuits having different natural frequencies. A multibit identification tag having two or more of these resonance circuits may therefore emit a multibit sequence having the pattern of all of the natural frequencies. Therefore, by determining which ones are the switched-on resonance circuits, unique coding and/or identification is possible. For example, 40-bit or 80-bit coding may be implemented, similarly to a barcode.

The space needed for the identification tag is a function of, among other things, the natural frequency of the resonance circuits. For a frequency band of 80 MHz around a center frequency of 2.45 GHz, which is typical in industrial applications, the dimensions of a resonance circuit lie in the range of a few $mm^2$. For example, for 80 resonance circuits, corresponding to 80-bit coding, which are each spaced apart by 1 MHz, the approximate space needed for the identification tag is a few $cm^2$. However, this space requirement may be reduced even further through refinements in construction.

This setting of the bit pattern, i.e., the presence of the correspondingly functioning resonance circuits, may be performed in production or by the user. The bit pattern may be set by the user, for example, by damaging or short-circuiting individual resonance circuits, using a laser beam, for example.

The excitation of a multibit tag may be performed, for example, using simultaneous multifrequency excitation or even using a chirp pulse, in which a frequency range is spanned that contains at least two natural frequencies of the resonance circuits (81, . . . ,8*n*). The quality of the resonance circuits must be sufficiently high that the answer of the identification tag is long enough to detect all frequencies transmitted and/or separate them from one another. A measurement of the bit pattern of the 80-bit RFID tag described above is typically in the range of microseconds, for example, 1 µs.

It is an advantage of such a remote-readable identification tag that multibit information may be read out very rapidly or simultaneously. Furthermore, its implementation through the use of passive components, for example, is simple, and, as such, may be performed commensurately cost-effectively.

It is advantageous if the transmitter/receiver antenna system is coupled to the resonance circuits, because this enables easily implementable wave transmission.

It is also advantageous if the transmitter/receiver antenna system has a primary resonance circuit and an input antenna and an output antenna connected thereto. The primary resonance circuit contains at least one primary capacitor, and at least one primary coil per resonance circuit. The at least two resonance circuits each also have in turn at least one secondary coil and one secondary capacitor, the respective secondary coil being inductively coupled to a corresponding primary coil.

Using such an arrangement, simple, low-wear, effective coupling of the antenna system to the resonance circuits, which is largely tolerant to bending, is possible.

However, a different number of antennas may also alternatively be used, for example, rather than only one combined transmitter/receiver antenna, multiple antennas may be used.

It is advantageous if each secondary capacitor has a different capacitance. The natural frequency of a resonance circuit may be set with high precision through the capacitance.

It is also advantageous if the remote-readable identification tag has a delay device, which produces a delay of the signal response between receiving a signal and emitting a signal. In this way, it is possible to identify multiple identification tags, even if they are excited by only one single pulse. Without spreading out the answer of the identification tags over time, they would answer simultaneously and therefore different bit patterns or multiple identical bit patterns would not be able to be discriminated or could only be discriminated at a great cost. Such a problem occurs, for example, if multiple products are to be detected simultaneously, in a shopping cart, for example.

In this case, it is particularly preferable if the respective delay time is significantly greater than the time for emitting the signals, because in this way the emitted signals may be well separated from one another.

Temporal equalizing of multiple identification tags is possible, for example, through statistical distribution of the delay time, alone or together with other measures (SuperTag, SAMSys, etc.). Thus, for example, natural or intentionally introduced manufacturing tolerances of the delay device may be exploited. For example, a spontaneous return answer of the identification tag may be implemented if an air gap or some other form of discharger is used, e.g., by allowing the characteristic of the charging capacitor or the air gap itself to vary within a manufacturing tolerance width. In this way, delay times of up to a few seconds, for example, may be implemented.

For an 80-bit RFID tag having an answer time of 1 microseconds, $10^6$ time windows may be occupied in one second, so that realistically 1000 identification tags may be identified simultaneously with a low error rate.

In general, it is advantageous if the time of the delay is significantly greater than the time for emitting the signals.

If an 80-bit RFID tag in the range of 2.45 GHz is used in a shopping cart, it is to be noted that currently these carts are typically manufactured from metal and therefore shield the signal emission. Irradiation/readout from above is possible, but the reliability of the readout is reduced. However, if the current shopping cart is replaced by one constructed of plastic, for example, then irradiation/readout from multiple directions is possible and thus identification may be optimized.

It is particularly favorable in regard to implementation if the delay device is an spark gap which may be powered, for example, by the primary capacitor.

It is also advantageous for application with various products if, preferably, the entire circuit, but at least the transmitter/receiver antenna system and the resonance circuits, are applied onto a flexible substrate using thin film technology. In this way, single crystal substrates may be dispensed with, thereby rendering production much more cost-effective. Due to the flexibility of the substrate, which can be made of, for example, paper or plastic, the identification tags are flat and are flexible to apply in the form of adhesive stickers or on packages, for example.

If an air gap powered by a charging capacitor is used, a rectifier for charging the charging capacitor is also favorably incorporated, and preferably applied using thin film technology.

Of course, the identification tag may also contain further components, for example, rectifiers, batteries, sensors, etc.

The applications for the invention generally relate to remote scanning for identifying objects, such as during shopping in supermarkets, in warehousing, or during transport within logistics chains. Possible fields of application are described in the advertising publication of Siemens AG (Systems "MOBY"), for example.

Instead of a radio wave signal, an acousto-magnetic signal, for example, may also be analogously used.

BRIEF DESCRIPTION OF THE DRAWING

The invention and further advantageous refinements thereof according to the features of the dependent claims are explained in more detail below with the aid of an exemplary embodiment depicted in the drawing, which shows a top view of a remote-readable identification tag.

DETAILED DESCRIPTION OF THE PREFERRED EMBODIMENTS

The drawing provides, by way of example, a magnified top view of a remote-readable identification tag T. A circuit arrangement is applied using thin film technology onto a substrate 11, so that the identification tag T is thereby rendered flexible. The circuit arrangement includes a transmitter/receiver antenna system 1 and n (n≧2) resonance circuits 81, . . . ,8*n*.

The transmitter/receiver antenna system 1 contains an input antenna 2 for receiving radio waves and an output antenna 3 for emitting radio waves. These two antennas 2, 3 are connected to a primary resonance circuit 4, which in turn has n primary coils 7, connected in series, having identical inductance Lp and a charging capacitor 5 having a capacitance $C_0$ and an integrated rectifier. In addition, a discharger is connected in series to the primary coils 7.

Each primary coil 7 has a resonance circuit 81, . . . ,8*n* lying opposite, each of which includes a secondary coil 9 having an inductance Ls and a secondary capacitor $101, \ldots, 10n$ having capacitance $C1, \ldots, Cn$. Each secondary coil 9 is inductively coupled to its respective primary coil 7. The inductance Ls of each secondary coil 9 is identical for each resonance circuit $81, \ldots, 8n$.

In contrast, the capacitances $C1, \ldots, Cn$ of the secondary capacitors $101, \ldots, 10n$ are each dimensioned mutually differently, and in such a way that the natural frequencies $f1, \ldots, fn$ of the resonance circuits $81, \ldots, 8n$ are equidistantly removed from one another at intervals of 1 MHz. The number n of resonance circuits $81, \ldots, 8n$ is, for instance, 80, so that an 80-bit RFID tag is provided.

The identification tag T may be operated in such a way that it responds to a radio signal emitted by an external transmitter. After the signal is received via the input antenna 2 of the identification tag T, after the charging capacitor 5 is charged, and after time-delayed triggering of the discharger 6, the resonance circuit 4 is set into resonance. This resonance is transmitted through the inductive coupling to the secondary resonance circuits $81, \ldots, 8n$, which in turn are excited to resonance if the frequency of the external radio wave corresponds to the natural frequency of the resonance circuit.

The resonance of the resonance circuits $81, \ldots, 8n$ is in turn emitted via the output antenna 3 and may thus be detected by an external receiver, and thereafter analyzed. If a frequency band of at least 80 MHz is covered using a chirp pulse, the entire spectrum of addressable natural frequencies $f1, \ldots, fn$ will be emitted.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A remote-readable identification tag, comprising:
   at least two resonance circuits which have mutually differing resonance frequencies;
   at least one transmitter-receiver antenna system coupled to the resonance circuits, wherein:
   a signal received by the antenna system is fed into the resonance circuits;
   a resonance signal of at least one of the resonance circuits is emitted via the antenna system; and
   identification coding is provided by a multi-bit sequence having a pattern corresponding to the mutually differing resonance frequencies;
   and further comprising:
   a delay device delaying a signal response between receiving the signal by the antenna system and feeding the signal into the resonance circuits.

2. The remote-readable identification tag according to claim 1, wherein the delay device comprises a spark gap.

3. The remote-readable identification tag according to claim 1, further comprising a flexible substrate onto which the antenna system and the resonance circuits are applied using thin film technology.

4. The remote-readable identification tag according to claim 3, wherein the flexible substrate is made of paper or plastic.

5. The remote-readable identification tag according to claim 1, further comprising a substrate for the antenna system and the resonance circuits, said substrate configured as at least one of a price label and a barcode.

6. A method of operating multiple identification tags, comprising:
   receiving a signal with respective transmitter-receiver antenna systems of the multiple identification tags;
   coupling the received signal into respective resonance circuits of the multiple identification tags after passage of respective delay times, wherein the delay times are of respectively different duration for the multiple identification tags;
   generating response signals in the respective resonance circuits; and
   outputting the generated signals from the respective transmitter-receiver antenna systems.

7. The method according to claim 6, wherein the signal received by the identification tag comprises at least one of an acousto-magnetic signal and a radio wave signal.

8. The method according to claim 7, wherein the signal comprises a radio wave signal in the form of a chirp pulse.

9. The method according to claim 8, further comprising:
   utilizing the signals outputted from the respective transmitter-receiver antenna systems for identifying products in a transport container;
   wherein the resonance circuits have respective resonance frequencies that differ from one another by at least 1 MHz.

10. A remote-readable identification tag, comprising:
    at least two resonance circuits which have mutually different resonance frequencies;
    at least one transmitter-receiver antenna system coupled to the resonance circuits; and
    a delay device delaying a signal response between a signal received by the antenna system and a signal emitted by the antenna system.

11. The remote-readable identification tag according to claim 10, wherein the delay device comprises a discharger.

12. The remote-readable identification tag according to claim 10, further comprising a flexible substrate onto which the antenna system and the resonance circuits are applied using thin film technology.

13. The remote-readable identification tag according to claim 12, wherein the flexible substrate is made of paper or plastic.

14. The remote-readable identification tag according to claim 10, further comprising a substrate for the antenna system and the resonance circuits, said substrate configured as at least one of a price label and a barcode.

15. The remote-readable identification tag according to claim 10, wherein the resonance circuits and the antenna system are inductively coupled.

16. The remote-readable identification tag according to claim 15, wherein the antenna system comprises a receiving antenna, a primary winding coupled to the receiving antenna, and a transmitting antenna.

17. The remote-readable identification tag according to claim 16, wherein the primary winding comprises a primary capacitor and respective primary coils for each of the resonance circuits.

18. The remote-readable identification tag according to claim 17, wherein each of the resonance circuits comprises a secondary coil and a secondary capacitor, and wherein the secondary coils are respectively inductively coupled to the primary coils of the primary winding.

19. The remote-readable identification tag according to claim 18, wherein the secondary capacitors have mutually differing capacitances.

20. A method of operating multiple identification tags, comprising:
- receiving a signal with respective transmitter-receiver antenna systems of the multiple identification tags;
- coupling the received signal into respective resonance circuits of the multiple identification tags;
- generating response signals in the respective resonance circuits; and
- outputting the generated signals from the respective transmitter-receiver antenna systems after passage of respective delay times relative to a time the signal was received, wherein the delay times are of respectively different duration for the multiple identification tags.

21. The method according to claim 20, wherein the delay times are temporally equalized.

22. The method according to claim 20, wherein the signal received by the identification tag comprises at least one of an acousto-magnetic signal and a radio wave signal.

23. The method according to claim 22, wherein the signal comprises a radio wave signal in the form of a chirp pulse.

24. The method according to claim 23, further comprising:
- utilizing the signals outputted from the respective transmitter-receiver antenna systems for identifying products in a transport container;
- wherein the resonance circuits have respective resonance frequencies that differ from one another by at least 1 MHz.

* * * * *